Sept. 3, 1968  A. R. BREED  3,399,589
SEALING FASTENER
Filed Dec. 29, 1965
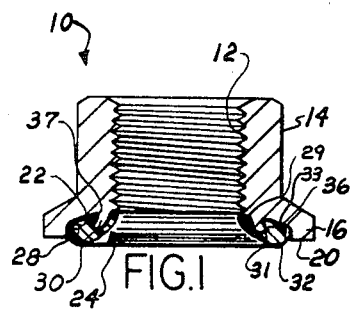
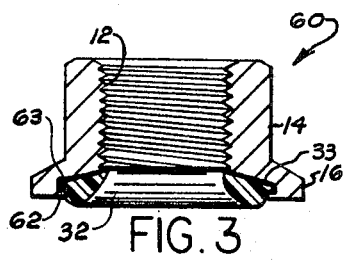
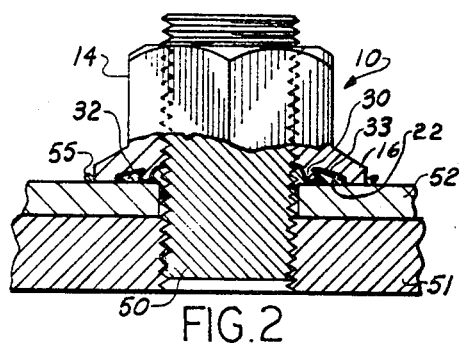
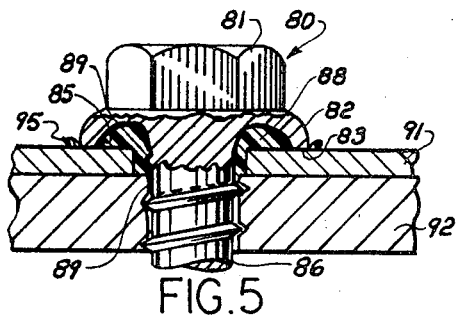
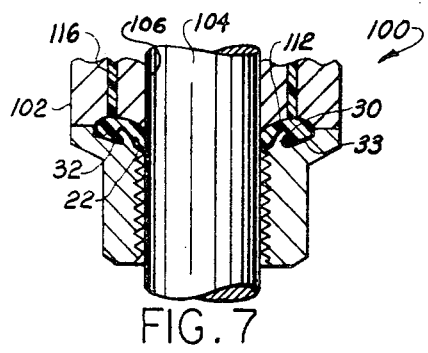
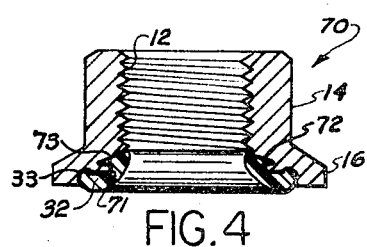
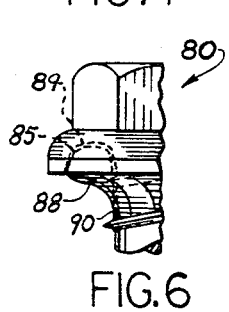
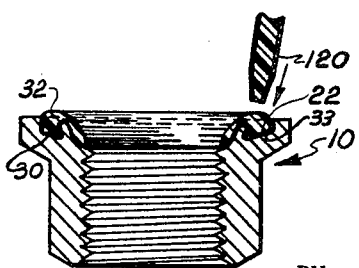
INVENTOR.
ARTHUR R. BREED
BY Hoffmann and Yount
ATTORNEYS

United States Patent Office 3,399,589
Patented Sept. 3, 1968

3,399,589
SEALING FASTENER
Arthur R. Breed, Euclid, Ohio, assignor to The Lamson & Sessions Co., Cleveland, Ohio, a corporation of Ohio
Filed Dec. 29, 1965, Ser. No. 517,257
9 Claims. (Cl. 85—1)

ABSTRACT OF THE DISCLOSURE

A sealing fastener comprising a fastener body and a sealing element disposed within a recess in the clamping surface of the fastener body, the sealing element projecting outwardly of the clamping surface and effecting a fluid pressure seal between the fastener body and the member against which the fastener body is clamped. The sealing element is cast directly within the recess, and the fastener body and sealing element have cooperable portions which engage one another to retain the sealing element within the recess while in its free state. A lubricating material applied to the interior surface area of the recess is provided to enable the fastener body to rotate relative to the sealing element as the latter is being drawn against the member. In an alternate embodiment, the annular sealing element is releasably bonded to the interior surface of the recess to retain the sealing element in the recess, the bond being releasable to enable the fastener body to rotate relative to the sealing element as the latter is being drawn against the member.

---

The present invention relates to sealing fasteners, and more particularly to sealing fasteners having a sealing element or washer disposed within a recess in the clamping surface of a fastener body and projecting outwardly of the clamping surface thereof for effecting a fluid pressure seal between the fastener body and a member against which the fastener body is adapted to be clamped. The present invention also relates to a method of making such sealing fasteners.

One of the problems heretofore encountered with sealing fasteners of the type described is that galling and/or cutting or tearing of the sealing element by the member often occurs as the fastener body is being drawn toward and against the member it is to be clamped to. This galling and/or cutting or tearing takes place as a result of the sealing element rotating relative to the member while being in frictional engagement therewith when the fastener body is being clamped to the member.

While various techniques have heretofore been employed to reduce the frictional resistance between the sealing element and fastener body so as to allow the fastener body to rotate relative to the sealing element when the latter frictionally engages the member, they have not proved satisfactory. This is because the frictional force between the sealing element and the bottom and/or side walls of the recess resisting relative rotation therebetween due to the sealing element being loaded thereagainst as it is being compressed between the fastener body and the member has usually still exceeded the frictional force resisting relative rotation between the sealing element and the member.

Accordingly, the present invention provides a new and improved sealing fastener having a fastener body and a sealing element disposed within a recess in the clamping surface of the fastener body and projecting outwardly thereof, and which is so constructed and arranged that the fastener body is free to rotate relative to the sealing element when the latter frictionally engages the member to which the fastener body is to be clamped irrespective of the loading forces exerted by the sealing element against the bottom and side walls of the recess at it is being compressed between the member and the fastener body whereby galling of the sealing element by the member and tearing thereof is prevented.

The present invention also provides a new and improved sealing fastener of the character defined in the next preceding paragraph, which includes a lubricating material disposed between the sealing element and the interior surface area of the recess which enables said fastener body to freely rotate relative to the sealing element as the latter is being compressed between the member and the fastener body.

The present invention additionally provides a new and improved sealing fastener of the character described and in which the sealing element is rotably supported within the recess of the fastener body while in its natural or free state.

The present invention further provides a new and improved sealing fastener of the character described and in which the sealing element is releasably bonded to the surface of the recess to retain the same therein prior to the fastener being used, the bond therebetween being readily releasable to allow the fastener to rotate relative to the sealing element when the frictional force between the sealing element and the member exceeds the bonding force between the sealing element and the fastener to prevent galling and/or tearing of the sealing element by the member.

The present invention further provides a new and improved sealing fastener of the character referred to and in which the fastener body has a threaded portion immediately adjacent the annular recess and in communication with the recess, and wherein the sealing element has an end portion which cooperatively engages the thread located immediately adjacent the recess to retain the sealing element in its free state within the recess.

The present invention further provides a new and improved seal nut having a nut body and a sealing element disposed within a recess in the clamping surface of the nut body and projecting outwardly thereof, and wherein the seal nut is so constructed and arranged that the nut body is free to rotate relative to the sealing element when the latter frictionally engages the member to which the nut body is to be clamped irrespective of the loading forces exerted by the sealing element against the bottom and side walls of the recess as it is being compressed between the member and the nut body whereby galling of the sealing element by the member is prevented.

The present invention also provides such a new and improved seal nut in which the recess communicates with the threaded opening in the nut and has a sloping bottom which causes the sealing element to be driven radially inwardly against the thread of a cooperating stem to also effect a fluid pressure seal against the stem as the nut body is being drawn against the member, and in which a lubricating material is disposed between the sealing element and the interior surface area of the recess in contact therewith to enable said nut body to freely rotate relative to the sealing element, the lubricating material also facilitating movement of the sealing element radially inwardly against the thread of the stem.

The present invention additionally provides a new and improved seal nut of the character described in the next two preceding paragraphs wherein the nut has a flange extending inwardly of the recess which cooperably engages a portion of the sealing element to rotatably support the sealing element wtihin the recess and retain the latter while in its free state within the recess.

The present invention also provides a new and improved fastener or seal nut of the character described, and wherein the sealing element comprises a plastic material cast directly within the recess.

The present invention also provides a new and improved method for making a sealing fastener from a fastener body having an annular recess in its bearing end which includes the steps of coating the interior surface area of the recess with a lubricant material and forming or casting an annular plastic sealing element directly within the recess and which projects outwardly of the bearing end thereof by flowing a plastic material in a liquid state into the recess and then curing the plastic material to solidify the same.

The present invention further provides a new and improved method for making a seal nut having a nut body provided with an annular recess in its bearing end and a sealing element disposed within the recess and projecting outwardly of the bearing end, and in which the nut body has its bearing end positioned against a mold means to form a mold having an annular cavity defined in part by the recess, and in which a plastic material in a liquid state is flowed into the cavity and then cured to solidify and develop desired properties of the plastic material to form an annular plastic sealing element directly within the recess and which projects outwardly of the bearing end thereof.

Further objects and advantages of the present invention will be apparent from the following detailed description of the embodiments thereof made with reference to the accompanying drawings forming a part of the present specification and in which similar reference numerals are used to designate corresponding or similar parts throughout the several views and in which:

FIG. 1 is an axial cross-sectional view of a fastener embodying the present invention;

FIG. 2 is a part elevational and part axial sectional view of the fastener shown in FIG. 1 and showing the same applied to a threaded stem and clamping a pair of members together;

FIG. 3 is an axial cross-sectional view of a modified form of fastener similar to the fastener shown in FIG. 1;

FIG. 4 is an axial cross-sectional view of a modified form of fastener similar to the fastener shown in FIGS. 1 and 3;

FIG. 5 is a fragmentary elevational view of another type of fastener embodying the present invention and showing the same clamping a pair of members together;

FIG. 6 is a fragmentary elevational view of the fastener shown in FIG. 5;

FIG. 7 is an axial cross-sectional view of a mold for forming part of the fastener shown in FIG. 1; and FIG. 8 is a schematic illustration of another method for forming part of the fastener shown in FIG. 1.

As representing one embodiment of the present inventions, FIGS. 1 and 2 of the drawings show a seal nut 10. The seal nut 10 has an axial threaded opening 12 therethrough and includes a body portion 14 and a flange portion 16 at one end of the body portion 14. The body and flange portions 14 and 16 may be of any suitable external configuration and are here shown as being hexagonal and circular in shape, respectively.

The flange portion 16 is the bearing end or side of the nut 10 and extends radially outwardly from the body portion 14. The flange portion 16 has an annular bearing surface 20 and an annular groove or recess 22 therein in which a sealing means 24 is disposed. The annular bearing surface 20 provides a bearing surface area which is the same as that for a standard or conventional hex nut of the same nominal nut size. The annular recess 22 extends axially inwardy from the plane of the bearing surface 20 and, in the embodiment shown, opens into or communicates with the opening 12. The recess 22 has an annular axially extending outer side wall 28 and a sloping bottom surface or wall 29. The flange portion 16 also has an integrally formed annular skirt 30 extending outwardly from the bottom surface 29 of the recess 22 toward the plane of the bearing surface 20 and having its outer end 31 terminating at a location spaced inwardly from the plane of the bearing surface 20 for retaining the sealing means 24 within the recess 22, and in a manner which is hereinafter more fully described. The skirt 30 is preferably located intermediate the inner and outer ends of the recess bottom 29 so as to provide recess space radially inwardly of the skirt 30. The surface of the recess bottom 29 radially inwardly of the skirt 30 is generally axially tapered so as to define a recess portion having a depth with respect to the plane of the bearing surface 20 which progressively decreases proceeding radially outwardly from the threaded portion of the opening 12 to the skirt 30.

The sealing means 24 disposed within the annular groove 22 comprises an annular sealing element or washer 32 and, in the preferred embodiment, a lubricating material or means 33 disposed between the interior surface area of the recess 22 and the sealing element 32. The sealing element 32 can be made from any suitable or conventional deformable material, preferably a deformable plastic material, such as polyvinyl chloride, and is preferably formed or cast directly in the recess 22, as will hereinafter be more fully described. The sealing element 32 fills or substantially fills the recess 22 when in its natural or free state and completely surrounds the skirt 30. The sealing element 32 has a portion thereof which projects axially outwardly of or beyond the annular bearing surface 20 and, in the preferred embodiment, has an exposed external surface which is generally convex with that portion of the surface facing toward the axis of the opening 12 flaring radially outwardly proceeding from the bottom 29 of the recess 22 at its juncture with the threaded opening 12 toward the outer end of the outwardly projecting portion located outwardly from the plane of the bearing surface 20. The sealing element 32 does not project or substantially project radially inwardly of the opening 12 and thus, no or only minimal initial engagement between the sealing element 32 and the threads of a stem when the nut 10 is being screwed thereon occurs, which insures that jamming between the threads on the stem and nut 10 due to material being flowed between the threads thereof will not occur.

The lubricating material 33 preferably comprises a film of lubricant which is coated or applied to the entire interior surface area of the recess 22, i.e., the entire surface area of the side wall 28, the bottom surface 29 and the skirt 30. The lubricating material may be of any suitable type, but is preferably a silicone grease. The lubricating material 33 enables or allows the nut 10 to rotate relative to the sealing element 32 when the latter is being compressed between the nut 10 and a member against which the nut is to be clamped irrespective of the loading forces exerted against the bottom 29, side wall 28 and the annular skirt 30 defining the recess 22 as a result of the sealing element 32 being compressed. The provision of the lubricating material 33 prevents or substantially prevents the sealing element 32 from rotating relative to the member and thus, prevents galling of the sealing element 32 by the member and insures that the sealing element 32 will not tear or cock so that it remains in a proper position to effectively provide a seal between the nut 10 and the member.

The sealing element 32 is rotatably supported within the recess 22 and retained therein while in its natural or free state by the annular skirt 30. As best shown in FIG. 1, the annular skirt or flange 30 has a radial thickness which is substantially less than the radial thickness of other portions of the nut body and is flared or curved radially outwardly along its axial extent proceeding from the bottom 29 of the recess 22 toward the end 31 thereof. The skirt 30 defines with the recess bottom 29 a grooved or recessed portion 36 which extends radially inwardly of the end 31 of the skirt 30 and which cooperably receives a portion 37 of the sealing element extending radially inwardly of the end 31 of the skirt 30, which portion 37, in the preferred embodiment, has a cross-sectional shape corresponding to the cross-sectional shape of the recessed portion 36. The sealing element preferably also hooks around the partially formed portion of the thread convolution at the juncture with the bottom wall 29 of the recess 22 to further aid in retaining the same in the recess. The skirt 30 in effect serves as a support ledge for rotatably supporting the sealing element 32 while in its free state within the recess 22. The support provided by the skirt 30 is effective to hold the sealing element 32 against axial displacement and prevents separation of the sealing element 32 from the nut 10 during storage, shipment or handling.

The seal nut 10 is usable to clamp a pair of members together and is adapted to cooperate with a threaded stem carried by one of the members and effect a fluid pressure seal with the member against which it is clamped as well as with the threaded stem it cooperably engages. As shown in FIG. 2, for example, the seal nut 10 cooperably engages a threaded stem 50 carried by or fixed to a member 51 to clamp another member 52 against the member 51, the member 52 having an opening through which the stem 50 extends or projects. As the seal nut 10 is rotated toward the member 51 to clamp the member 52 thereagainst, the sealing element 32 will engage the member 52 and be compressed. As the sealing element 32 begins to be compressed, the nut 10 when further rotated toward the members will rotate relative to the sealing element 32, since the frictional force between the sealing element 32 and the member 52 resisting rotation greatly exceeds the frictional force resisting rotation between the sealing element 32 and the nut 10 due to the provision of the lubricating material 33 disposed therebetween. Continued rotation of the nut 10 toward the members causes the sealing element to be further compressed or deformed and due to the outwardly flared contour of the skirt 30 and the sloping bottom 30 of the recess 22 to be also flowed or driven radially inwardly against the threads on the stem 50. The deformation of the sealing element 32 is at least part elastic and any excess material of the sealing element which cannot be accommodated within the space defined by the threads on the stem and the recess and the side wall of the opening in the member 52 will flow radially outwardly of the radial flange portion 16 of the nut, as indicated by reference numeral 55 in FIG. 2. When the nut 10 is tightly drawn or clamped against the member 52, the bearing surface 20 exerts a clamping pressure thereon such that the member 52 is securely clamped to the member 51.

The provision of a lubricating material 33 disposed between the sealing element 32 and the interior surface area of the groove 22 of the nut 10, which allows the nut 10 to rotate relative to the sealing element 32 upon the latter engaging the member 52, prevents galling of the sealing element 32 by the member 52 and insures that the sealing element 32 will not tear or be cocked so that it will remain in a proper position to effect the fluid pressure seal between the nut 10 and the member 52 as well as between the nut 10 and the threads on the stem 50. The provision of the lubricating material 33 also facilitates or aids in flowing the material of the sealing element 32 radially inwardly against the threads on the stem 50 since it minimizes resistance to radial flow.

Moreover, the clamping loads that can be carried by the nut 10 are the same as that for conventional hex nuts, since the bearing surface area provided is the same within tolerance limitations as that of a standard or conventional hex nut of the same nominal nut size. It should be also noted that the seal nut 10 is reusable as a seal nut, since at least part of the deformation of the plastic sealing element 32 that takes place is an elastic deformation.

As representing another embodiment of the present invention, FIG. 3 shows a seal nut 60. The seal nut 60 is of an identical construction to the seal nut 10 except that it has an annular sealing element 32 of a slightly different cross-sectional shape and a different means for retaining the sealing element within the recess 22. In this embodiment, the side wall 28 of the recess 22 at its outer end is provided with an integral, annular radially inwardly extending projection or flange 62 which defines with the bottom wall 30 a radially extending groove or recess which cooperably receives an annular radially outwardly extending projection or flange 63 on the sealing element 32. The cooperative engagement between the flanges 62 and 63 is effective to retain the sealing element 32 within the recess 22 while in its natural or free state and prevent axial displacement and separation of the sealing element 32 from the recess 22 during storage, shipment or handling. The sealing element preferably also hooks around the partially formed portion of the thread convolution at the juncture with the bottom wall 29 of the recess 22 to further aid in retaining the same in the recess. The sealing element 32 for the nut 60 has a generally tear-drop shape, as viewed in cross section. The seal nut 60 functions in the same manner to effect a fluid pressure seal as the seal nut 10.

As representing yet another embodiment of the present invention, FIG. 4 shows a seal nut 70. The seal nut 70 is of a substantially identical construction to the seal nut 10 except that the bottom 29 of the recess 22 between its inner and outer ends thereof has a generally radially inwardly extending annular skirt or flange 71 which defines with the recess bottom 29 a radially outwardly disposed recessed or grooved portion 72 and which cooperably receives a radially outwardly extending portion 73 on the sealing element 32 to rotatably support and retain the latter within the groove 22 while in its natural or free state. The cooperative engagement between the portions 71 and 73 is effective to prevent axial displacement and separation of the sealing element from the groove during storage, shipment or handling. The seal nut 70 functions in the same manner to effect a fluid pressure seal as the seal nuts 10 and 60.

As representing another embodiment of the present invention, FIGS. 5 and 6 of the drawings show a threaded sealing fastener in the form of a self-tapping screw 80. The self-tapping screw 80 has a head 81 provided with a radially outwardly extending annular flange portion 82 at its bearing end. The head 81 has an upper portion which may be of any suitable configuration, here shown as being hexagonal in shape. The flange portion 82 extends radially outwardly from the upper portion of the head 81 and has an underside comprising an annular clamping or bearing surface 83 and an annular recess or groove 85 extending axially inwardly from the plane of the bearing surface 83. The bearing surface 83, in the embodiment shown, provides a bearing surface area which is the same as that for the same nominal size conventional self-tapping screw within tolerance limitations. The self-tapping screw includes a threaded shank or stem 86 projecting axially from the underside of the flange portion 82. The groove 85 surrounds the stem 86 with the latter forming a side wall of the recess 85. The recess 85 is generally cup-shaped and has a surface contour which is concave as viewed from the bearing surface. The recess 85 has a depth as measured from the plane of the bearing surface which progressively decreases proceeding radially outwardly from a location adjacent the stem 86 toward the opposite side wall portion of the recess 85.

Disposed within the annular recess 85 is a sealing means comprising an annular sealing element or washer 88 and, in the preferred embodiment, a lubricating material 89 disposed between the interior surface area of the groove 85 and the sealing element 88. As shown in FIG. 6, the sealing element 88 in its natural state projects axially outwardly of or beyond the bearing surface 83 and has an annular skirt portion 90 surrounding the upper portion of a stem 86 and extending axially thereof. The lubricating material 89 is applied to the entire interior surface area of the recess 85 and the upper portion of the stem which the sealing element contacts and is in the form of a lubricant film. The sealing element 88 and the lubricating material 89 can be made from the same material as the sealing element and the lubricating material for the seal nut 10.

The sealing element 88 is retained within the groove 85 by the cooperable engagement between the outer end of the skirt portion 90 of the sealing element 88 and the first thread convolution on the stem 86 proceeding outwardly from the plane of the bearing surface 83 of the head 81. The first thread convolution supports and retains the sealing element 88 within the groove 85 while in its natural or free state during shipment, storage or handling.

The self-tapping sealing screw 80 is usable to clamp a pair of members together, such as the members 91 and 92 shown in FIG. 5. The sealing screw 80 projects through an opening in the member 91 and taps a screw thread on the side wall of the opening in the member 92 by a self-tapping action. As the screw 80 is rotated toward the member 92 to clamp the member 91 thereagainst the sealing element 88 engages the member 91 and begins to compress or deform. As the sealing element 88 begins to deform, the screw 80, as it continues to be rotated toward the member 92, rotates relative to the sealing element 88, since the frictional force between the sealing element 88 and member 91 resisting rotation greatly exceeds the frictional force between the sealing element 88 and the screw 80 resisting rotation due to the lubricating material 89 disposed therebetween. Continued rotation of the screw 80 toward the members causes the sealing element to be further deformed and due to the surface contour of the recess to be flowed or driven radially inwardly against the threads on the stem 86 and axially downwardly into the opening in the member 91. The deformation of the sealing element 88 is at least part elastic and any excess material of the sealing element 88 which cannot be accommodated within the space provided between the threads on the stem 86 and the recess and opening in the member 91 will flow or be extruded radially outwardly of the screw, as indicated by the reference numeral 95 in FIG. 5. When the screw 80 is tightly drawn or clamped against the host member 91, the bearing surface 83 applies a clamping pressure against the member 91 such that the members 91 and 92 are securely clamped together.

From the foregoing, it is apparent that the provision of the lubricating material 89 to allow the screw 80 to rotate relative to the sealing element 88 prevents galling of the sealing member 88 by the member 91 and insures that the sealing element 88 will not be torn or cocked so that it remains in a proper position to effect a fluid pressure seal between the screw and the host member 91. The provision of the lubricating material 89 also facilitates or aids in driving or flowing the material of the sealing element radially inwardly and axially downwardly along the stem 86 since it reduces the resistance to such flow.

While the sealing fasteners of the present invention, in their preferred embodiments, are provided with a separate lubricating material disposed between the sealing elements and the surface areas of the fastener that the sealing elements are in contact with, it will of course be understood that plastic materials which do not adhere to such surface areas and which are self-lubricating or include a lubricating material as part of their composition may be employed to form the sealing elements and thus, eliminate the need for a separate lubricating material.

It is also within the compass of the present invention to provide a releasable bond between the annular sealing elements and the interior surface areas of the recesses in the fasteners. By providing a releasable bond, the sealing elements can be effectively retained within the recesses of the fasteners without the need for any other or a separate retaining means. The releasable bond may be provided by applying a lubricant material to only certain or a major portion of the surface areas of the fasteners which would contact the sealing material of the elements to provide small or minor surface areas to which the sealing material can adhere. Alternately, a separate readily releasable bonding material of any suitable or conventional composition may be provided to bond the sealing elements to the fastener. The extent of the releasable bond is such that it will effectively retain the sealing elements in the recesses during storage, shipment and handling, but which will readily release to permit the fastener to rotate relative to the sealing element when the latter frictionally engages the member to which the fastener is to be clamped.

The present invention also provides novel methods for making a sealing fastener from a preformed fastener body having an annular recess or groove at its bearing end or side. These methods comprise, in general, coating the surface areas of the fastener body against which the sealing element will load or bear with a lubricating material, such as a silicone grease, flowing a plastic material in a liquid state into the recess of the fastener and curing the plastic material to solidify the same to form an annular sealing element formed or cast directly within the recess.

As illustrating one method for making such sealing fasteners, FIG. 7 shows a mold 100 for forming or casting an annular sealing element directly within the recess of a nut body formed identical to the nut body for the seal nut 10. The mold 100 includes a mold means comprising an annular member 102 which forms the upper part of the mold 100, as viewed in FIG. 7, and a mandrel or core 104 which is slidably received at its upper end within an aperture 106 in the member 102. The mandrel 104 is cylindrically shaped and has a diameter which is slightly less than the crest diameter of the threads of the threaded opening 12 of the nut body.

The mold 100 is formed by inserting the mandrel 104 into the threaded opening 12 of the nut body and then positioning the member 102 against the bearing end of the nut body with the latter forming the lower part of the mold 100. The member 102 has an annular recess or groove 112 therein which defines with the recess 22 in the nut body and the mandrel 104 an annular mold cavity having a cross-sectional shape which corresponds to the cross-sectional shape of the annular sealing element desired to be formed or cast.

After the entire interior surface area of the recess 22 and preferably the surface of at least the first thread convolution adjacent the recess are coated with a lubricating material, such as a silicone grease, and the mold 100 formed as noted above, a preheated plastic material in a liquid state, preferably polyvinyl chloride, is flowed through a passageway 116 in the member 102 communicating with the mold cavity until the entire cavity of the mold 100 is filled. The liquid plastic can be flowed into the cavity either by gravity or under a slight pressure and as it is flowed therein it will flow down and around the partially formed thread convolution immediately adjacent the bottom 29 of the recess 22. The plastic material and the lubricating material are then preferably cured by heating the same to approximately 550° to solidify the plastic and develop the desired properties thereof to form the sealing element 32. The mandrel 104 and the member 102 are then removed from the nut leaving the sealing element 32 intact.

It will of course be understood that in forming or casting the sealing element 88 for the fastener, shown in FIG. 4, a member similar to the member 102 and which slidably fits over the stem 86 and which has an annular groove therein which cooperates with the groove 85 to define a cavity having a shape which corresponds to the shape of the sealing element 88 is provided.

FIG. 8 schematically illustrates another method which may be employed for forming or casting an annular sealing element directly within the recess of a nut body, here shown formed identical to the nut body of the seal nut 10. In this method the annular sealing element is formed, after the recess 22 and preferably at least the first thread convolution adjacent the recess are coated with a lubricating material, such as a silicone grease, by flowing a preheated plastic material into the recess 22 of the nut while the nut body is being rotated about its axis. The preheated plastic material, preferably polyvinyl chloride, can be flowed through a suitable ejection nozzle 120 having its discharge opening positioned above the recess 22. The annular skirt 30 provides a dam for trapping a portion of preheated plastic material between the skirt 30 and the outer side wall 28 and for limiting the amount of material which flows thereover and into the portion of the recess 22 located radially inwardly thereof. The natural properties of the preheated plastic material are such that little, if any, will tend to flow down into the threads of the threaded opening 12 upon engaging the recess bottom adjacent the threaded opening 12 and that it will naturally form a generally convex outer or exposed surface when flowed into the recess 22. The plastic material is then cured in the same manner as previously described in connection with the method illustrated in FIG. 7.

It will of course be understood that a mandrel such as the mandrel 104, shown in FIG. 7, could be employed to insure that none of the plastic material flows down into the threads of the threaded opening 12. It will also be understood that this method could also be used for forming the sealing elements for seal nuts 60 and 70, but that preferably a mandrel is employed to prevent plastic material from flowing down into the threads of the threaded opening 12.

From the foregoing, it can be seen that novel sealing fasteners which are of a highly practical construction, which can be economically produced and which provide an effective fluid pressure seal for a wide range of applications has been provided. Moreover, it can be seen that a novel sealing fastener which rotates relative to the element carried thereby upon the latter engaging a member to which the fastener is to be clamped to prevent galling of the sealing element and to insure that the sealing element is maintained in a proper position to effect a fluid pressure seal between the host member and the fastener has been provided. Additionally, it can be seen that a novel method for making sealing fasteners from a fastener body and in which the sealing element is directly formed or cast within the annular groove of the fastener has been provided.

While various and preferred embodiments of the present invention have been described in considerable detail, it is hereby my intention to cover all constructions, modifications and arrangements which fall within the ability of those skilled in the art to which the invention pertains and within the scope and spirit of the appended claims.

I claim:

1. A threaded sealing fastener for use in connecting two members together comprising a threaded fastener body having a thread convolution to be disposed coaxially with an opening in said member and a clamping surface for applying a clamping pressure to one of said members, an annular recess in said clamping surface, an annular sealing element rotatably supported within said recess while in its free state and having a portion projecting outwardly beyond said clamping surface, said sealing element having a surface engaging and generally conforming to the configuration of substantially the entire interior surface area of said recess, a lubricating material in the form of a lubricant film applied to the entire interior surface area of said recess, and retaining means comprising cooperably engageable portions on said fastener body and said sealing element for rotatably supporting and retaining said sealing element in its free state within said recess, said fastener body rotating relative to said sealing element when the latter engages said member and is being compressed between said one member and said fastener body as said fastener body is being drawn toward said members.

2. A threaded sealing fastener for use in connecting two members together comprising a threaded fastener body having a thread convolution to be disposed coaxially with an opening in said member and a clamping surface for applying a clamping pressure to one of said members, an annular recess in said clamping surface having a bottom spaced axially inwardly from the plane of said clamping surface, an annular sealing element in said recess which projects outwardly of said clamping surface for providing a seal between the fastener body and said one member, and means for retaining said sealing element within said recess while in its free state, said means comprising an annular flange projecting outwardly from the bottom of said recess and whose end terminates at a location spaced inwardly from the plane of the clamping surface, said flange flaring radially outwardly proceeding from the bottom of said recess toward said end and defining with said bottom an annular radially extending recessed portion, said sealing element having an annular radially extending projection thereon, said radially extending projection on said sealing element being receivable in said radially extending recessed portion whereby said flange retains said sealing element within said groove while in its free state.

3. A threaded sealing fastener for use in connecting two members together comprising a threaded fastener body having a thread convolution and a clamping surface radially spaced from said thread convolution for applying a clamping pressure to one of said members, and lubricating and sealing means disposed in a recess in said fastener body between said thread convolution and said clamping surface comprising an unstressed sealing element having one portion thereof projecting axially outwardly of said surface for providing a seal between the fastener body and said one member and another portion in said recess engaging substantially the entire interior surface area of said recess and conforming in configuration to the interior surface area engaged thereby, said means providing lubrication between said sealing element and substantially the entire surface engaged thereby, and retaining means interconnecting said sealing element and said fastener body for retaining said sealing element in said recess with the latter in its natural state and for enabling rotation of said fastener body relative to said sealing element when said sealing element engages said one member and is being compressed between said one member and said fastener body as said fastener body is being drawn toward said members, said retaining means comprising cooperably engageable portions on said fastener body and said sealing element for rotatably retaining and supporting said sealing element in its free state within said recess.

4. A threaded sealing fastener as defined in claim 3 wherein said retaining means interconnecting said sealing element and fastener body includes a portion of said fastener body defining a substantially circular shoulder which at least partially defines said recess and is engaged by said other portion of said element at an area of said shoulder which is axially inwardly of said clamping surface.

5. A threaded sealing fastener, as defined in claim 3, wherein said retaining means interconnecting said sealing element and fastener body includes a releasable bonding means which at least partially bonds the sealing element to said interior surface area of said recess and which is readily releasable to allow said fastener body to rotate to said sealing element.

6. A threaded sealing fastener, as defined in claim 3, wherein said fastener body includes an axially projecting stem which forms a side wall for said recess, said thread convolution being formed on said stem and terminating outwardly of said clamping surface, and wherein said recess has a surface contour which is concave as viewed from the said clamping surface and a bottom having a depth which progressively decreases radially outwardly from a location adjacent said stem, said contour of said recess causing said sealing element as it is being compressed between said fastener body and said member to be cammed radially inwardly against the stem and axially therealong to also effect a seal between the stem and said one member, said means interconnecting said sealing element and said fastener body including a collar portion of said sealing element which extends around said stem and axially outwardly of said one portion of said sealing element to engage said thread convolution to thereby hold said sealing in engagement with said interior surface area of said recess.

7. A threaded sealing fastener for use in connecting two members together comprising a nut having a threaded opening therethrough to be disposed coaxially with an opening in one member for cooperating with a threaded stem and a clamping surface for applying pressure to one of said members, an annular recess in said clamping surface surrounding and communicating with said threaded opening, said recess having a sloping bottom whose depth as measured from the clamping surface progressively decreases radially outwardly of said threaded opening, an annular sealing element rotatably supported within said recess while in its free state and having a portion projecting outwardly beyond said clamping surface, and retaining means comprising cooperably engageable portions on said nut and said sealing element for rotatably supporting and retaining said sealing element in its free state within said recess, said nut rotating relative to a lubricating material in the form of a lubricant film applied to the entire interior surface area of said recess when said sealing element engages said one member and is being compressed between said one member and said nut as said nut is being drawn toward said members to cause said sealing element to be driven radially inwardly against the cooperating threaded stem to effect a seal between the nut and the threaded stem.

8. A threaded sealing fastener, as defined in claim 7, wherein said nut has an annular skirt projecting outwardly from the bottom of the recess and whose outer end terminates at a location spaced inwardly from the plane of said clamping surface, said skirt flaring radially outwardly proceeding from said bottom toward its outer end to define with said bottom a radially extending recessed portion, and wherein said sealing element has an annular radially extending projection thereon, said radially extending projection being freely received in said radially extending recessed portion whereby said skirt retains said sealing element within said groove while in its free state.

9. A threaded sealing fastener comprising a fastener body, a thread convolution formed on said fastener body, a bearing surface formed on said fastener body and located radially outwardly of said thread convolution, said fastener body having a surface area defining a recess in said body between said thread convolution and said bearing surface, a cast sealing element having a surface engaging and generally complemental to the configuration of substantially the entire surface area of said recess, said sealing element including a radially outer portion which projects axially outwardly of said bearing surface for sealingly engaging a member to be secured by said fastener and a radially inner portion which is at least partially bonded to said thread convolution and adapted to retain said cast sealing element in said recess while said sealing element is in its natural state, and a lubricating material between said surface area defining said recess and said inner surface of said sealing element to enable said bond between said thread convolution and said sealing element to be readily broken by rotation of said fastener body relative to said sealing element.

References Cited
UNITED STATES PATENTS

| | | | |
|---|---|---|---|
| 2,678,585 | 5/1954 | Ellis | 85—50 |
| 2,870,812 | 1/1959 | Heller | 151—38 |
| 3,087,370 | 4/1963 | Iaia | 85—9 |
| 3,144,803 | 8/1964 | Briles | 85—32 |
| 3,175,454 | 3/1965 | Morse | 85—9 |
| 3,220,453 | 11/1965 | Green | 151—7 |
| 2,941,105 | 6/1960 | Rickenbach | 85—50 |

FOREIGN PATENTS

| | | |
|---|---|---|
| 123,346 | 1/1947 | Australia. |
| 569,550 | 5/1945 | Great Britain. |
| 1,369,544 | 7/1964 | France. |
| 630,809 | 12/1962 | Italy. |

MARION PARSONS, JR., *Primary Examiner.*